US007450354B2

(12) United States Patent
Tain et al.

(10) Patent No.: US 7,450,354 B2
(45) Date of Patent: Nov. 11, 2008

(54) LINEAR VOLTAGE REGULATOR WITH IMPROVED RESPONSES TO SOURCE TRANSIENTS

(75) Inventors: Ya-Der Tain, Taipei County (TW); Yung-Chih Chen, Pingtung County (TW)

(73) Assignee: Aimtron Technology Corp., Hsinchu (TW)

( * ) Notice: Subject to any disclaimer, the term of this patent is extended or adjusted under 35 U.S.C. 154(b) by 509 days.

(21) Appl. No.: 11/162,363

(22) Filed: Sep. 8, 2005

(65) Prior Publication Data

US 2007/0053115 A1 Mar. 8, 2007

(51) Int. Cl.
*H02H 7/00* (2006.01)
*H02H 9/00* (2006.01)
*H02H 3/22* (2006.01)

(52) U.S. Cl. ............................ 361/18; 361/111; 361/56

(58) Field of Classification Search ................. 361/111, 361/18, 56

See application file for complete search history.

(56) References Cited

U.S. PATENT DOCUMENTS 5,561,391 A * 10/1996 Wellnitz et al. ............. 327/309
6,246,555 B1 * 6/2001 Tham .......................... 361/18
6,320,363 B1 11/2001 Oglesbee et al.
6,388,433 B2 5/2002 Marty
6,445,167 B1 9/2002 Marty
6,501,253 B2 * 12/2002 Marty ........................ 323/280
6,580,257 B2 6/2003 Marty
6,804,102 B2 10/2004 Hamon et al.
6,838,916 B2 * 1/2005 Premont et al. ............. 327/132

* cited by examiner

*Primary Examiner*—Michael J Sherry
*Assistant Examiner*—Lucy Thomas
(74) *Attorney, Agent, or Firm*—Winston Hsu

(57) ABSTRACT

A linear voltage regulator has a regulating transistor with a first channel electrode receiving an input voltage source and a second electrode providing an output voltage. A control electrode of the regulating transistor is controlled by an error amplifying circuit based on comparison between a feedback signal of the output voltage and a reference voltage. An event detecting circuit is coupled to the input voltage source for detecting occurrence of a transient in the input voltage source. In response to the detected transient event, an enable controlling circuit generates an enable signal for determining an effective operation time of a voltage clamping circuit. During such effective operation time, a potential difference between the first channel electrode and the control electrode is limited within a predetermined clamp voltage for preventing the regulating transistor from being dramatically changed in operation.

9 Claims, 3 Drawing Sheets

LINEAR VOLTAGE REGULATOR WITH IMPROVED RESPONSES TO SOURCE TRANSIENTS

BACKGROUND OF THE INVENTION

1. Field of the Invention

The present invention relates to a linear voltage regulator and, more particularly, to a linear voltage regulator capable of effectively controlling an output voltage even while an input voltage source makes a transient.

2. Description of the Prior Art

FIG. 1 is a circuit diagram showing a conventional linear voltage regulator 10. The linear voltage regulator 10 primarily includes a regulating transistor 11, a voltage feedback circuit 12, and an error amplifying circuit 13, all together constituting a feedback control loop. The voltage feedback circuit 12 is typically implemented by a voltage divider of series-connected resistors R1 and R2, for generating a feedback signal $V_{fb}$ as a representative of an output voltage $V_{out}$. Based on comparison between the feedback signal $V_{fb}$ and a predetermined reference voltage $V_{ref}$, the error amplifying circuit 13 generates an error signal $V_{err}$. Subsequently, the error signal $V_{err}$ is applied to a control electrode of the regulating transistor 11. Also, the regulator transistor 11 has a first channel electrode receiving an input voltage source $V_{in}$ and a second channel electrode providing the output voltage $V_{out}$ to a load 14. Through appropriately controlling the channel conductance of the regulating transistor 11 by the error signal $V_{err}$, the output voltage $V_{out}$ is effectively maintained at a desired regulation value, at which a load current is supplied on demand to the load 14.

Unfortunately, when the input voltage source $V_{in}$ makes a transient, the regulating transistor 11 changes dramatically in operation, causing the output voltage $V_{out}$ to be out of regulation and to oscillate for a long period of time. Referring to FIG. 1(B), it is assumed that the input voltage source $V_{in}$ makes a rising transient at time T0, and therefore a potential difference $V_{sg}$ between the source and gate electrodes of the regulating transistor 11 correspondingly makes a rising transient since the source electrode is connected to the input voltage source $V_{in}$. The sudden rise in the potential difference $V_{sg}$ rapidly increases the conductance of the regulating transistor 11, which results in an inrush to the channel current $l_q$ through the regulating transistor 11 and then increasing the output voltage $V_{out}$. Although through the feedback control provided by the error amplifying circuit 13, the output voltage $V_{out}$ is eventually settled at the desired regulation value, as shown at time T1, the huge overshoot and extensive oscillation of the output voltage $V_{out}$ fail to meet the requirement of most application specifications.

Similarly, it is assumed that the input voltage source $V_{in}$ makes a falling transient at time T2, and therefore the potential difference $V_{sg}$ correspondingly makes a falling transient. The sudden fall in the potential difference $V_{sg}$ rapidly suppresses the conductance of the regulating transistor 11, and at some time even completely turns off the regulating transistor 11 to cease the channel current $l_q$. In this case, the output capacitor $C_{out}$ must be discharged in order to compensate the unsatisfied requirement of the load current, and therefore the output voltage $V_{out}$ decreases. Although through the feedback control provided by the error amplifying circuit 13, the output voltage $V_{out}$ is eventually settled at the desired regulation value, as shown at time T3, the huge overshoot and extensive oscillation of the output voltage $V_{out}$ fail to meet the requirement of most application specifications.

SUMMARY OF THE INVENTION

An object of the present invention is to provide a linear voltage regulator capable of preventing the operation state of the regulating transistor from dramatically changing while an input voltage source makes a transient, thereby improving the regulation control over the output voltage.

A linear voltage regulator according to the present invention includes a regulating transistor, a feedback circuit, an error amplifying circuit, an event detecting circuit, an enable controlling circuit, and a voltage clamping circuit. The regulating transistor has a control electrode, a first channel electrode, and a second channel electrode. The first channel electrode is connected to an input voltage source. The second channel electrode provides an output voltage. The feedback circuit generates a feedback signal representative of the output voltage. Based on comparison between the feedback signal and a predetermined reference voltage, the error amplifying circuit generates an error signal for controlling the control electrode. The event detecting circuit is coupled to the input voltage source and generates an event signal indicative of a transient event of the input voltage source. The enable controlling circuit generates an enable signal in response to the event signal. In response to the enable signal, the voltage clamping circuit clamps a potential difference between the first channel electrode and the control electrode.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The above-mentioned and other objects, features, and advantages of the present invention will become apparent with reference to the following descriptions and accompanying drawings, wherein.

DETAILED DESCRIPTION

The preferred embodiments according to the present invention will be described in detail with reference to the drawings.

Figure 1A:
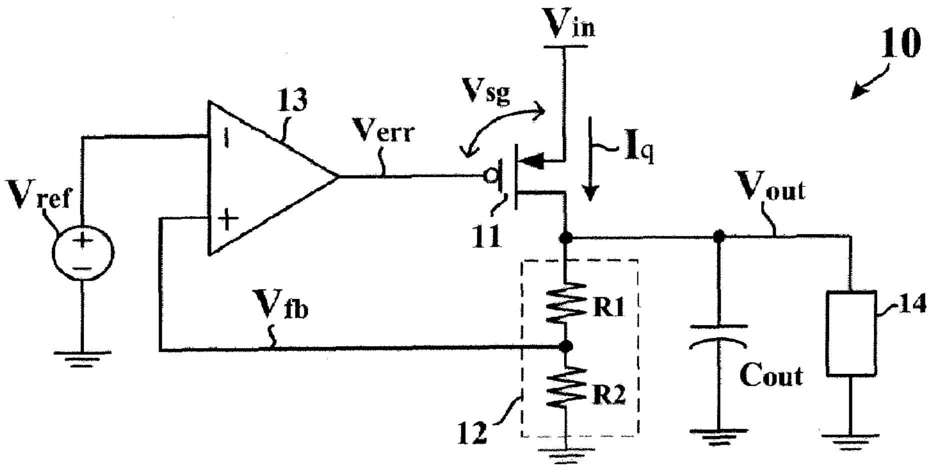
FIG. 1(A) (Prior Art)
FIG. 1(A) is a circuit diagram showing a conventional linear voltage regulator.
Figure 1B:
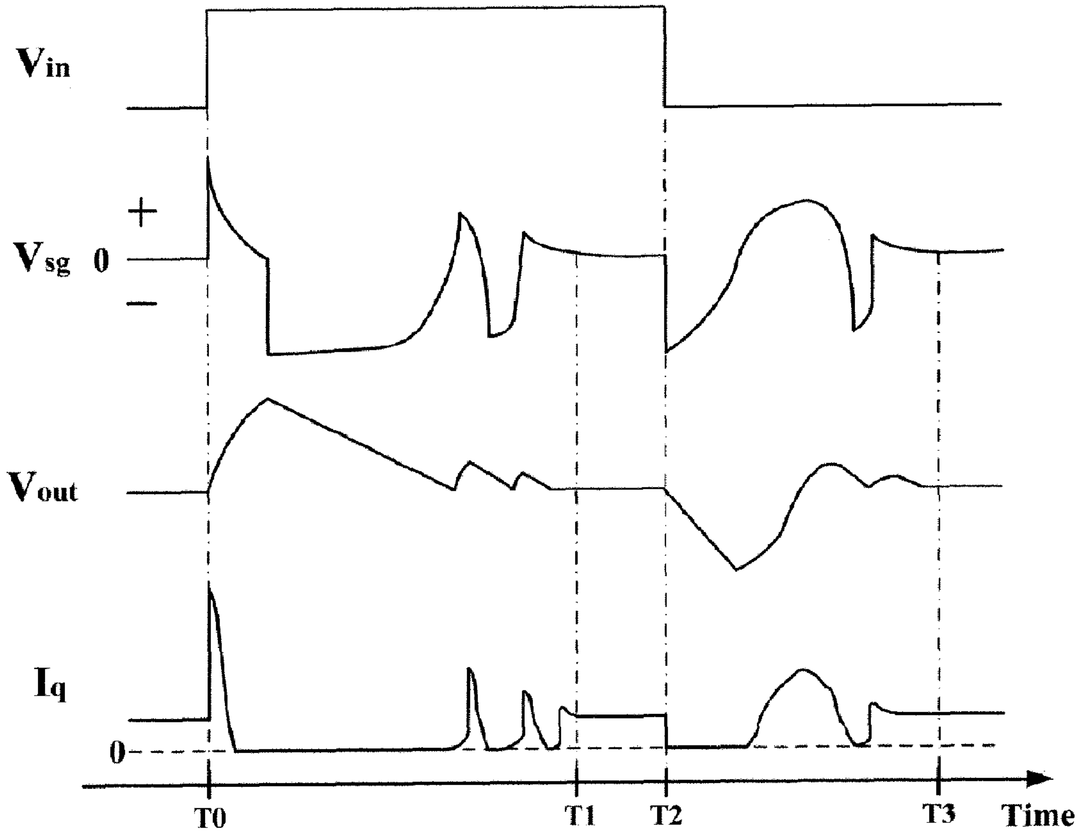
FIG. 1(B) (Prior Art)
FIG. 1(B) is a waveform timing chart showing an operation of a conventional linear voltage regulator.
Figure 2A:
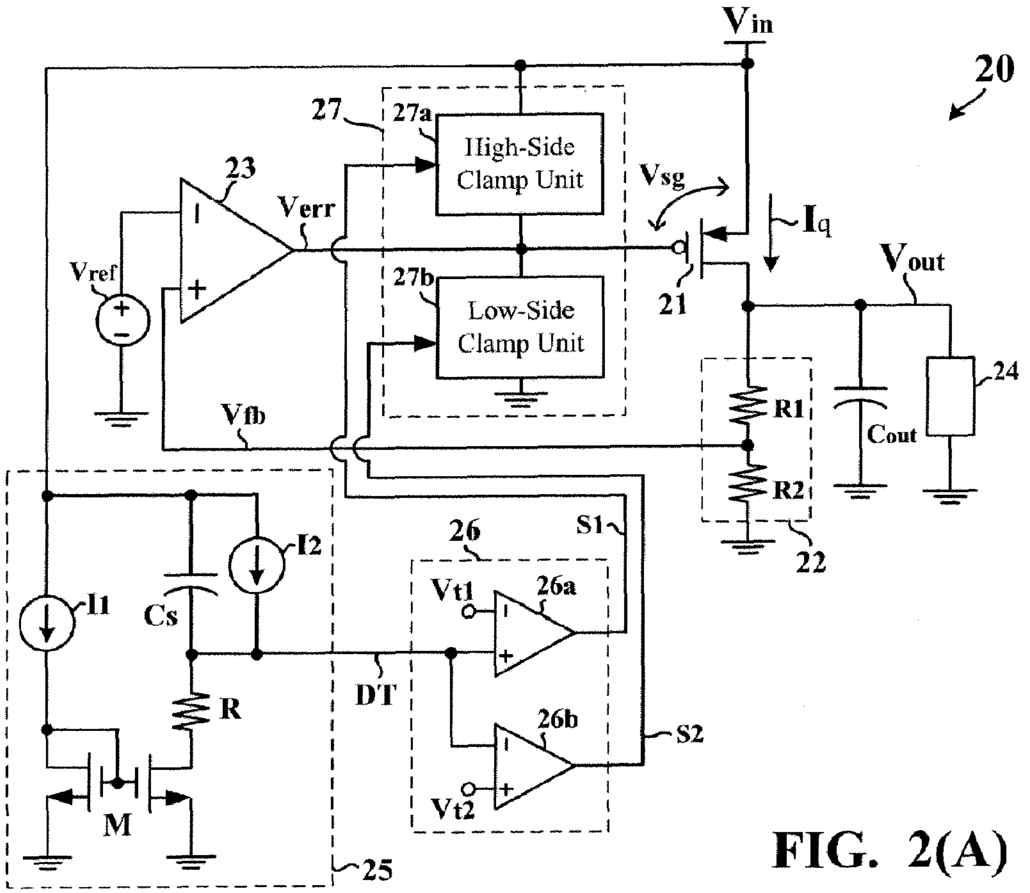
FIG. 2(A) is a circuit diagram showing a linear voltage regulator according to the present invention.

FIG. 2(A) is a circuit diagram showing a linear voltage regulator 20 according to the present invention. The linear voltage regulator 20 primarily includes a regulating transistor 21, a voltage feedback circuit 22, and an error amplifying circuit 23, all together constituting a feedback control loop. The voltage feedback circuit 22 is typically implemented by a voltage divider of series-connected resistors R1 and R2, for generating a feedback signal $V_{fb}$ as a representative of an output voltage $V_{out}$. Based on comparison between the feedback signal $V_{fb}$ and a predetermined reference voltage $V_{ref}$, the error amplifying circuit 23 generates an error signal $V_{err}$. Subsequently, the error signal $V_{err}$ is applied to a control electrode of the regulating transistor 21. Also, the regulator transistor 21 has a first channel electrode receiving an input voltage source $V_{in}$ and a second channel electrode providing the output voltage $V_{out}$ to a load 24. Through appropriately controlling the channel conductance of the regulating transistor 21 by the error signal $V_{err}$, the output voltage $V_{out}$ is effectively maintained at a desired regulation value, at which a load current is supplied on demand to the load 24.

In order to reduce the impact on regulating transistor 21 applied by the transient of the input voltage source $V_{in}$, the linear voltage regulator 20 according to the present invention is provided with an event detecting circuit 25, an enable controlling circuit 26, and a voltage clamping circuit 27. The event detecting circuit 25 generates an event signal DT for indicating the occurrence of the transient event of the input voltage source $V_{in}$. In response to the event signal DT, the enable controlling circuit 26 generates a first enable signal S1 and a second enable signal S2 for determining an effective operation time of the voltage clamping circuit 27. Since the transient of the input voltage $V_{in}$ directly affects the potential difference $V_{sg}$ between the source and gate electrodes of the regulating transistor 21, the voltage clamp circuit 27 restrains the potential difference $V_{sg}$ under a predetermined clamp voltage in order to prevent the regulating transistor 21 from dramatically changing in operation.

More specifically, the event detecting circuit 25 may be formed by a capacitor $C_s$, a discharge current source 11, and a charge current source 12. The capacitor $C_s$ has a first terminal connected to the input voltage source $V_{in}$ and a second terminal connected to the discharge current source 11 through a current mirror M and a resistor R. The charge current source 12 is connected in parallel with the capacitor $C_s$. While the input voltage source $V_{in}$ makes a transient, the voltage at the second terminal of the capacitor $C_s$ correspondingly rises up along with the voltage at first terminal of the capacitor $C_s$ because the potential difference across the capacitor $C_s$ cannot be changed abruptly. Therefore, the desired event signal DT can be retrieved from the second terminal of the capacitor $C_s$. After the rising transient, the voltage at the second terminal of the capacitor $C_s$ is gradually decreased by the discharge current source 11 for returning to the basic stable value BV. After the falling transient, the voltage at the second terminal of the capacitor $C_s$ is gradually increased by the charge current source 12 for returning to the basic stable value BV. In one embodiment, the current provided by the discharge current source 11 is designed to be twice larger than the charge current source 12.

The enable controlling circuit 26 has a first comparator 26*a* and a second comparator 26*b*. Based on comparison between the event signal DT and a predetermined first trigger voltage $V_{t1}$, the first comparator 26*a* generates the first enable signal S1. Based on comparison between the event signal DT and a predetermined second trigger voltage $V_{t2}$, the second comparator 26*b* generates the second enable signal S2. The first trigger voltage $V_{t1}$ is designed to be higher than the basic stable value BV while the second trigger voltage $V_{t2}$ is designed to be lower than the basic stable value BV. Therefore, the first comparator 26*a* is triggered to generate the first enable signal S1 while the input voltage source $V_{in}$ makes a rising transient, and the second comparator 26*b* is triggered to generate the second enable signal S2 while the input voltage source $V_{in}$ makes a falling transient.

The voltage clamping circuit 27 has a high-side clamp unit 27*a* and a low-side clamp unit 27*b*. The first enable signal S1 determines an effective operation time of the high-side clamp unit 27*a*, and the second enable signal S2 determines an effective operation time of the low-side clamp unit 27*b*.

Figure 2B:
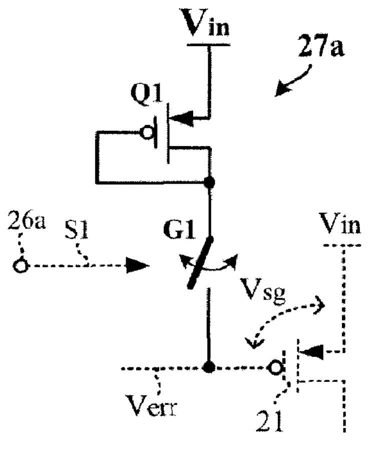
FIG. 2(B) is a circuit diagram showing a high-side clamp unit according to the present invention.

FIG. 2(B) is a circuit diagram showing a high-side clamp unit 27*a* according to the present invention. Referring to FIG. 2(B), the high-side clamp unit 27*a* primarily includes a switching device G1 implemented by a transistor or a transmission gate, and a clamping device implemented by a transistor Q1. The switching device G1 is turned on and off by the first enable signal S1 from the first comparator 26*a*. When the switching device G1 is turned off, the gate electrode of the regulating transistor 21 is only under control of the error signal $V_{err}$ from the error amplifying circuit 23. That is, at this moment the high-side clamp unit 27*a* exerts no influence on the gate electrode of the regulating transistor 21. Once the switching device G1 is turned on by the first enable signal S1, however, the input voltage source $V_{in}$ is coupled through the transistor Q1 to the gate electrode of the regulating transistor 21. Since the transistor Q1 is diode-connected, i.e. the gate and drain electrodes are connected together, the transistor Q1 has a function of clamping the potential difference between the input voltage source $V_{in}$ and the gate electrode of the regulating transistor 21 within a diode forward voltage drop if the tiny on-resistance of the switching device G1 is neglected. As a result, the potential difference $V_{sg}$ between the source and gate electrodes of the regulating transistor 21 is clamped within the diode forward voltage drop since the voltage at the source electrode of the regulating transistor 21 is equal to the input voltage source $V_{in}$.

Figure 2C:
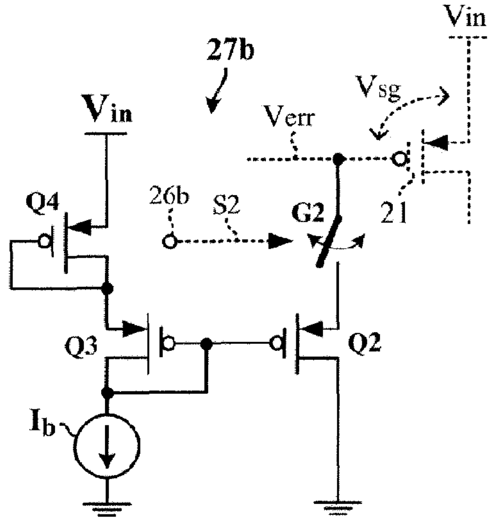
FIG. 2(C) is a circuit diagram showing a low-side clamp unit according to the present invention.

FIG. 2(C) is a circuit diagram showing a low-side clamp unit 27*b* according to the present invention. Referring to FIG. 2(C), the low-side clamp unit 27*b* primarily includes a switching device G2 implemented by a transistor or a transmission gate, and a clamping device implemented by transistors Q2, Q3, and Q4. The switching device G2 is turned on and off by the second enable signal S2 from the second comparator 26*b*. The transistors Q2 and Q3 together make up a current mirror. The transistor Q3 has a drain electrode connected to a ground potential through a constant current source $I_b$, and a source electrode connected to the input voltage source $V_{in}$ through the transistor Q4. The transistor Q4 is diode-connected, i.e. the gate and drain electrodes are connected together. When the switching device G2 is turned off, the gate electrode of the regulating transistor 21 is only under control of the error signal $V_{err}$ from the error amplifying circuit 23. That is, at this moment the low-side clamp unit 27*b* exerts no influence on the gate electrode of the regulating transistor 21. Once the switching device G2 is turned on by the second enable signal S2, however, the input voltage source $V_{in}$ is coupled to the gate electrode of the regulating transistor 21 through the transistor Q4 and the current mirror Q2 and Q3. Based on the symmetry of electrical characteristics of the current mirror, the voltage at the source electrode of the transistor Q2 is substantially equal to the voltage at the source electrode of the transistor Q3. As a result, the potential difference between the input voltage source $V_{in}$ and the voltage at the source electrode of the transistor Q2 is clamped within a diode forward voltage drop. Since the voltage at the source electrode of the regulating transistor 21 is equal to the input voltage source $V_{in}$, the potential difference $V_{sg}$ between the source and gate electrodes of the regulating transistor 21 is clamped within the diode forward voltage drop if the tiny on-resistance of the switching device G2 is neglected.

Figure 3:
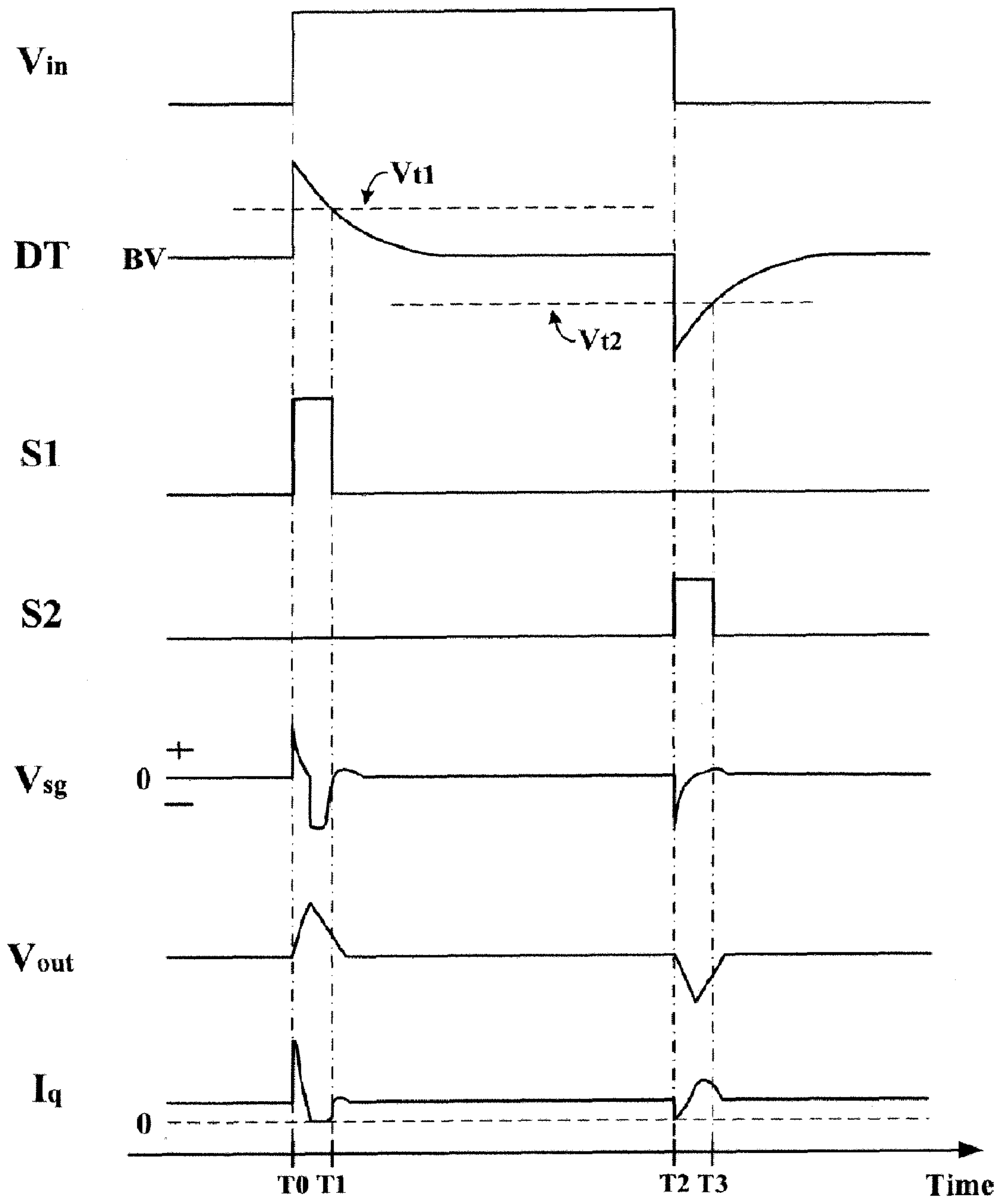
FIG. 3 is a waveform timing chart showing an operation of a linear voltage regulator according to the present invention.

FIG. 3 is a waveform timing chart showing an operation of a linear voltage regulator 20 according to the present invention. Assumed that the input voltage source $V_{in}$ makes a rising transient at time T0 such that the event signal DT of the event detecting circuit 25 suddenly jumps up over the first trigger voltage $V_{t1}$ at the same time, the first comparator 26*a* of the enable controlling circuit 26 is triggered. After the rising transient, the event signal DT gradually decreases and eventually returns to the basic stable value BV, especially at time T1 the event signal DT becoming lower than the first trigger voltage $V_{t1}$. Therefore, the first enable signal S1 generated by the first comparator 26*a* is a pulse signal for enabling the high-side clamp unit 27*a* from time T0 to time T1. The period from time T0 to time T1 is considered the effective operation time of the high-side clamp unit 27*a*, during which the regulating transistor 21 is prevented from being driven into saturation, thereby significantly improving the responses of the transistor current $I_q$ and the output voltage $V_{out}$.

Similarly assumed that the input voltage source $V_{in}$ makes a falling transient at time T2 such that the event signal DT of the event detecting circuit 25 suddenly dives down below the second trigger voltage $V_{t2}$ at the same time, the second comparator 26*b* of the enable controlling circuit 26 is triggered.

After the falling transient, the event signal DT gradually increases and eventually returns to the basic stable value BV, especially at time T3 the event signal DT becoming higher than the first trigger voltage $V_{t2}$. Therefore, the second enable signal S2 generated by the second comparator 26*b* is a pulse signal for enabling the low-side clamp unit 27*b* from time T2 to time T3. The period from time T2 to time T3 is considered the effective operation time of the low-side clamp unit 27*b*, during which the regulating transistor 21 is prevented from being driven into saturation, thereby significantly improving the responses of the transistor current $I_q$ and the output voltage $V_{out}$.

Although the embodiment described above concurrently employs the first and second comparators 26*a* and 26*b* and the high-side and low-side clamp units 27*a* and 27*b* for improving the responses of the output voltage $V_{out}$ to both of the rising and falling transients, the present invention is not limited to this and may be applied to a case where only the improvement in one direction, either rising or falling, is necessary. More specifically, if it is the response to the rising transient that needs to be improved, only are the first comparator 26*a* and the high-side clamp unit 27*a* necessary to be employed. On the other hand, if it is the response to the falling transient that needs to be improved, only are the second comparator 26*b* and the low-side clamp unit 27*b* necessary to be employed.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A linear voltage regulator comprising:

a regulating transistor having a control electrode, a first channel electrode connected to an input voltage source, and a second channel electrode for providing an output voltage;

a feedback circuit for generating a feedback signal representative of the output voltage; and an error amplifying circuit for, based on comparison between the feedback signal and a predetermined reference voltage, generating an error signal for controlling the control electrode;

an event detecting circuit, coupled to the input voltage source, for generating an event signal indicative of a transient event of the input voltage source;

an enable controlling circuit having a first comparator and a second comparator for generating a first enable signal and a second enable signal in response to the event signal, a first predetermined trigger voltage, and a second predetermined trigger voltage, wherein the event signal is coupled to the first comparator and the second comparator; and a voltage clamping circuit for clamping a potential difference between the first channel electrode and the control electrode in response to the first enable signal and the second enable signal.

2. The linear voltage regulator according to claim 1, wherein:

the first enable signal and the second enable signal determines an effective operation time of the voltage clamping circuit such that the potential difference between the first channel electrode and the control electrode is clamped during the effective operation time.

3. The linear voltage regulator according to claim 1, wherein:

the voltage clamping circuit clamps the potential difference within a diode forward drop.

4. The linear voltage regulator according to claim 1, wherein:

the event detecting circuit includes:

a capacitor having a first terminal connected to the input voltage source, and a second terminal for providing a voltage to serve as the event signal, and a current source for allowing the voltage at the second terminal to return to a basic stable value.

5. The linear voltage regulator according to claim 4, wherein:

the current source includes:

a discharge current source for allowing the voltage at the second terminal to fall back to the basic stable value, and a charge current source for allowing the voltage at the second terminal to rise back to the basic stable value.

6. The linear voltage regulator according to claim 1, wherein:

the voltage clamping circuit includes:

a switching device being turned on and off by the enable signal, and a clamping device for clamping the potential difference between the first channel electrode and the control electrode when the switching device is turned on.

7. The linear voltage regulator according to claim 6, wherein:

the clamping device is implemented by a diode-connected transistor and is connected in series between the input voltage source and the switching device.

8. The linear voltage regulator according to claim 6, wherein:

the clamping device is implemented by a diode-connected transistor and a current mirror such that the diode-connected transistor is connected between the input voltage source and the current mirror, and the switching device is connected between the control electrode and the current mirror.

9. The linear voltage regulator according to claim 1, wherein:

the voltage clamping circuit includes:

a high-side clamp unit coupled between the input voltage source and the control electrode for clamping the potential difference between the first channel electrode and the control electrode while the input voltage source makes a rising transient, and a low-side clamp unit coupled between the control electrode and a ground potential for clamping the potential difference between the first channel electrode and the control electrode while the input voltage source makes a falling transient, wherein:

the high-side clamp unit is controlled by the first enable signal and the low-side clamp unit is controlled by the second enable signal.

* * * * *